(12) United States Patent
Cowans

(10) Patent No.: US 9,416,723 B2
(45) Date of Patent: Aug. 16, 2016

(54) AIR SUPPLY CONCEPTS TO IMPROVE EFFICIENCY OF VCRC ENGINES

(71) Applicant: Kenneth W. Cowans, Fullerton, CA (US)

(72) Inventor: Kenneth W. Cowans, Fullerton, CA (US)

( * ) Notice: Subject to any disclaimer, the term of this patent is extended or adjusted under 35 U.S.C. 154(b) by 0 days.

(21) Appl. No.: 14/779,070

(22) PCT Filed: Apr. 7, 2014

(86) PCT No.: PCT/US2014/033146
§ 371 (c)(1),
(2) Date: Sep. 22, 2015

(87) PCT Pub. No.: WO2014/168861
PCT Pub. Date: Oct. 16, 2014

(65) Prior Publication Data
US 2016/0061161 A1 Mar. 3, 2016

Related U.S. Application Data

(60) Provisional application No. 61/809,525, filed on Apr. 8, 2013.

(51) Int. Cl.
*F02D 23/00* (2006.01)
*F02B 37/04* (2006.01)
*F16L 37/26* (2006.01)
(Continued)

(52) U.S. Cl.
CPC . *F02B 37/04* (2013.01); *F02B 1/12* (2013.01); *F02B 5/02* (2013.01); *F02B 19/12* (2013.01); *F02B 33/40* (2013.01); *F02B 37/10* (2013.01); *F02B 37/12* (2013.01); *F02B 37/16* (2013.01); *F02B 39/10* (2013.01); *F02B 75/02* (2013.01); *F02B 75/04* (2013.01); *F02B 77/11* (2013.01); *F02D 15/04* (2013.01);
(Continued)

(58) Field of Classification Search
CPC .......... F02B 37/04; F02B 37/10; F02B 37/12; F16L 37/26; F02D 23/00
USPC .... 122/48 R, 50 B, 65 R, 559.1, 559.2, 48 D, 122/609, 564; 60/605.1
See application file for complete search history.

(56) References Cited

U.S. PATENT DOCUMENTS

| | | |
|---|---|---|
| 2,500,234 A | 3/1950 | Bates |
| 2,585,968 A | 2/1952 | Schneider |

(Continued)

FOREIGN PATENT DOCUMENTS

| | | | |
|---|---|---|---|
| JP | 62248827 A | * | 10/1987 |
| JP | 01280635 A | * | 11/1989 |

OTHER PUBLICATIONS

International Search Report of PCT/US2014/033146.
(Continued)

*Primary Examiner* — Mahmoud Gimie
(74) *Attorney, Agent, or Firm* — Mattingly & Malur, PC

(57) ABSTRACT

The air supply to internal combustion engines using variable compression ratio and variable fuel supply VCRC, is improved. The improvements involve increasing thermal efficiency and/or reducing production of pollutants by this engine. The improvements can also be used with other engines that are regulated by fuel supply such as two-stroke diesel engines. These improvements are directed to engines in two basic categories; those with mechanical blowers only and those with turbo charging.

8 Claims, 5 Drawing Sheets

(51) Int. Cl.
*F02B 37/10* (2006.01)
*F02B 37/12* (2006.01)
*F02B 77/11* (2006.01)
*F02B 5/02* (2006.01)
*F02B 19/12* (2006.01)
*F02B 1/12* (2006.01)
*F02B 33/40* (2006.01)
*F02B 37/16* (2006.01)
*F02B 39/10* (2006.01)
*F02B 75/02* (2006.01)
*F02B 75/04* (2006.01)
*F02D 15/04* (2006.01)
*F02M 35/10* (2006.01)
*F02B 19/00* (2006.01)

(52) U.S. Cl.
CPC ......... *F02M 35/10157* (2013.01); *F16L 37/26* (2013.01); *F02B 2019/006* (2013.01)

(56) References Cited

U.S. PATENT DOCUMENTS

| | | | | |
|---|---|---|---|---|
| 4,502,283 | A | * | 3/1985 | Wandel .................. F02B 37/04 |
| | | | | 123/564 |
| 5,582,156 | A | | 12/1996 | Cullum et al. |
| 5,906,098 | A | | 5/1999 | Woollenweber et al. |
| 6,708,654 | B2 | | 3/2004 | Cowans |
| 6,814,064 | B2 | * | 11/2004 | Cowans .................. F02B 25/18 |
| | | | | 123/559.1 |
| 8,266,897 | B2 | | 9/2012 | Driscoll et al. |
| 2002/0104492 | A1 | | 8/2002 | Cowans |
| 2003/0015185 | A1 | * | 1/2003 | Dutart .................. B01D 53/22 |
| | | | | 123/585 |

OTHER PUBLICATIONS

Ricardo, Harry R., The High Speed Internal Combustion Engine, Fourth Edition, Blackie & Son, Ltd., 1967, referred to as Ricardo, states on p. 200.

* cited by examiner

AIR SUPPLY CONCEPTS TO IMPROVE EFFICIENCY OF VCRC ENGINES

CROSS-REFERENCE TO RELATED APPLICATIONS

This application is the U.S. national phase, under 35 U.S.C. §371, of PCT/US2014/033146, filed Apr. 7, 2014, published as WO2014/168861 A2 and A3 on Oct. 16, 2014 and claiming priority to U.S. patent application No. 61/809,525, filed Apr. 8, 2013, the disclosures of which are expressly incorporated herein by reference.

FIELD OF THE INVENTION

This invention relates to air supply concepts for internal combustion (IC) engines designed to improve engine efficiency, improve power to weight ratios, and reduce emitted pollutants in a configuration which is readily manufacturable. The realizations are most applicable to variable compression ratio and charge engines (VCRC engines as described in U.S. Pat. No. 6,708,654) used in automotive applications; particular those used in passenger vehicles or light-duty trucks.

BACKGROUND OF THE INVENTION

A major objective of the invention is to provide a prime mover heat engine with higher average efficiency. This is vitally needed in today's political climate. Overall system efficiency is needed. Power spent in manufacture is equally as that spent in powering the system. A lighter weight and smaller configuration is needed much more than has heretofore been the case. This is particularly true at power demands much less than the engine's maximum. This is the mission of the passenger automobile. For this application, efficiency at low engine torque at moderate speeds is of prime interest since most of the time an automobile engine operates at approximately 10% of its maximum power output at moderate speeds-typically 1,500 to 3,000 rpm.

The engineering terminology used in this specification follows standard mechanical engineering practice.

Current Standard Automotive Practice:

Currently, standard automotive practice is usually to employ a spark-ignition (SI) engine with an average thermal efficiency around 20%. That is, about 20% of the thermal energy of the fuel used is transferred to mechanical energy during an average driving cycle. Alternatively, a compression-ignition (CI) engine, more commonly called a diesel engine, is used and has a somewhat higher efficiency (ca. 25%) at average passenger car usage. The added efficiency of the CI engine is, in passenger car application, somewhat offset by the added weight of current CI engines. A typical passenger car using a CI engine is no more efficient than a car of equal performance using a SI engine. The comparison of apparent fuel mileage (miles per gallon or mpg) differences between cars powered by SI engines and those by CI engines is obscured by the difference in energy content of diesel fuel and gasoline. Diesel fuel has more energy for a given volume, liter or gallon, than has gasoline. Thus an accurate comparison of a CI car that gave 40 mpg with a spark-engine driven car giving 35 mpg would show that the two vehicles use about the same amount of energy. Even more exact comparisons, that consider performance of the two autos shows that the CI-driven car is often less efficient than a vehicle of equivalent performance powered by a SI engine. Support for this argument comes from the choice by Toyota in the use of an SI engine for the Prius. The Prius is designed to provide the ultimate in fuel mpg using contemporary techniques.

BRIEF SUMMARY OF THE INVENTION

Systems and methods in accordance with the invention deliver increased efficiency and/or decreased pollution when used with a VCRC engine. Especially advantageous are the realizations applied to the engine in passenger car or light truck use. The value realized is increased efficiency at low power at moderate speeds. This is the average mission for all passenger vehicles and most light trucks. All realizations presented could be used for other IC engine types as well.

BRIEF DESCRIPTION OF THE DRAWINGS

Discussion of Intent of the Invention.

Figure 2:
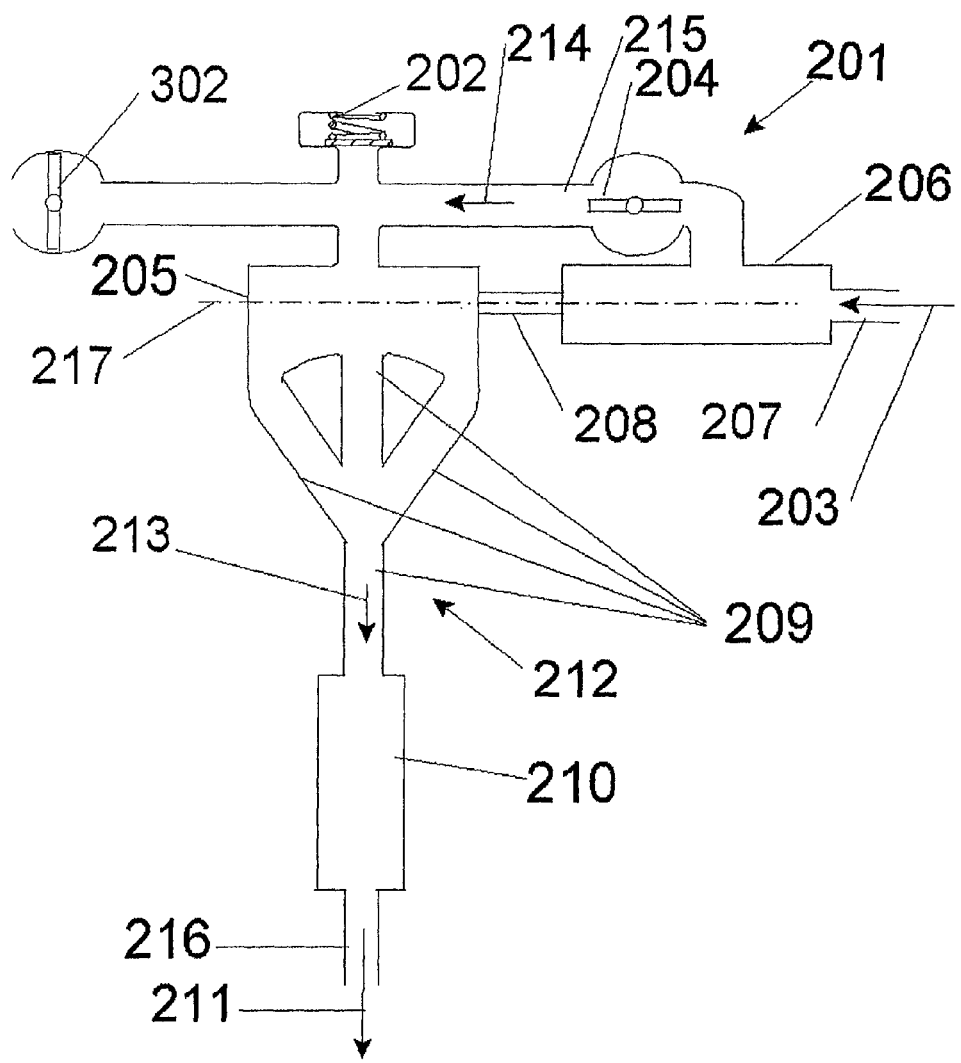
FIG. 2 and FIG. 3 show systems that are simpler and less in first cost.

Systems to Reduce Pollution by Decreasing Engine Air Flow:

The FIG. 2 shows the details of system 201. System 201 maintains exhaust temperature of engine 205 above a minimum. It varies speed of blower 206 for this purpose by controlling coupling 208. In this manner, exhaust flow 213 is held hot enough. This is needed to allow a thermal reactor or catalytic converter (not shown) to oxidize pollutants.

Figure 3:
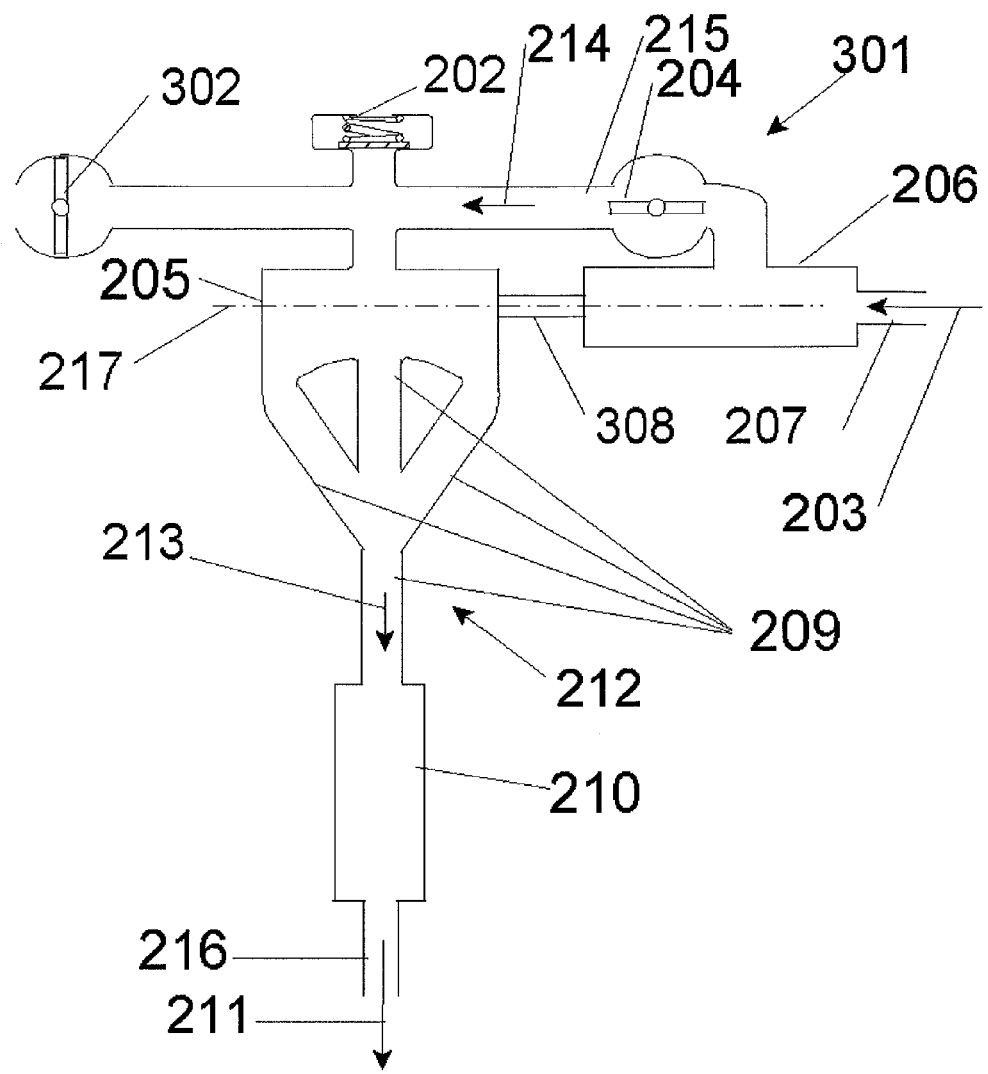

System 301 shown in FIG. 3 holds exhaust temperature high by controlling blow-off valve 302. This is done to regulate air flow through engine 205.

Figure 4:
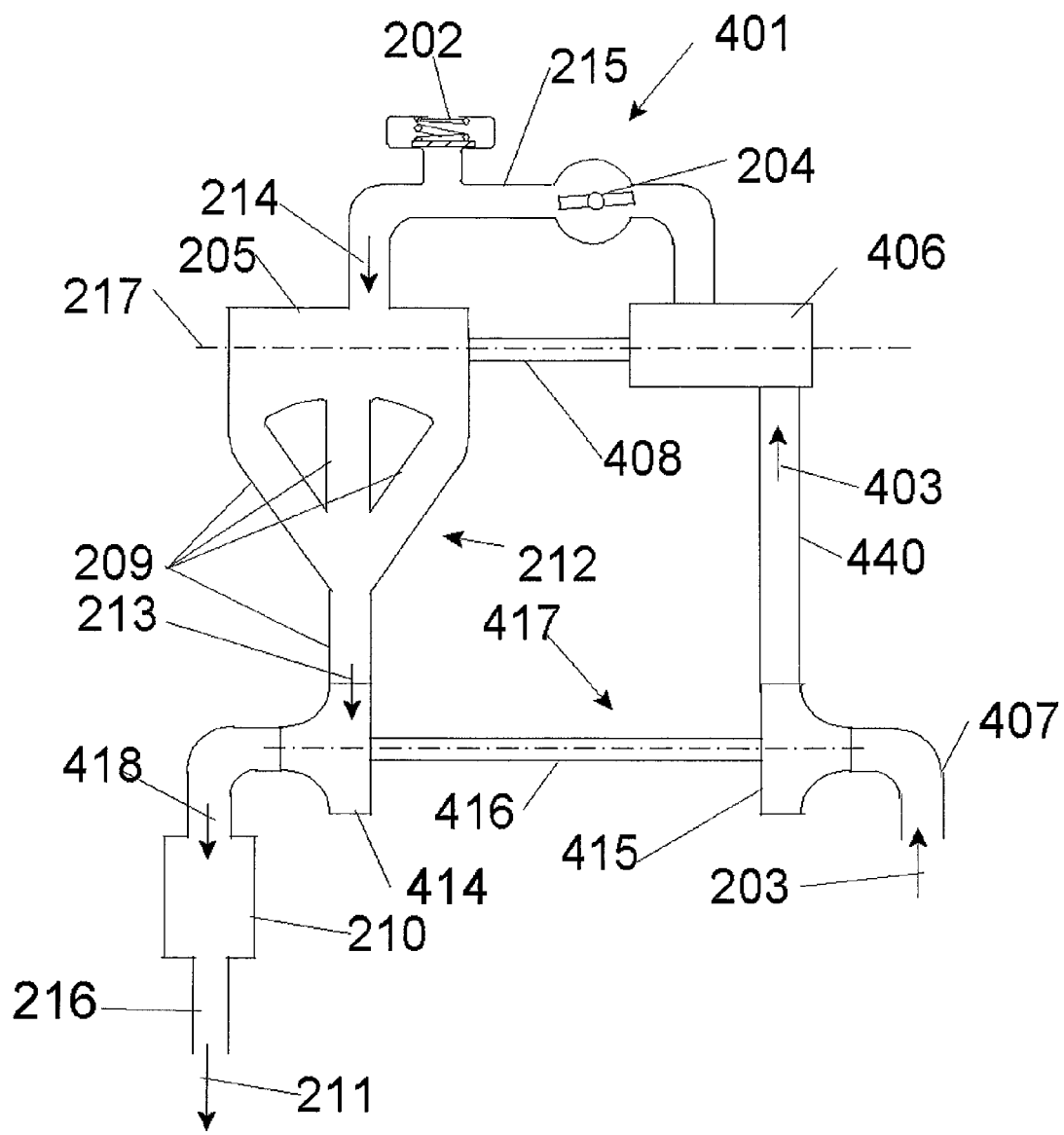
FIG. 4 and FIG. 5 show these.

Systems Using a Turbocharger to Increase Efficiency:

FIG. 4 shows a system 401 using a turbocharger plus a mechanical blower/motor 406. Blower/motor 406 is of the type of blower that can function as a motor. Such is the case if input pressure to blower/motor 406 is higher than its output. Speed of blower/motor 406 relative to engine 205 speed is varied by regulation of coupling 408. Coupling 408 is controlled by a servo mechanism in response to a signal from a pressure sensor at flow 214. An override from the temperature exhaust at flow 213 also controls coupling 408. This override maintains the temperature needed by the oxidizing system mentioned in discussion of FIG. 1. In this way, the thermal reactor or catalyst is effective in reducing pollution.

Figure 5:
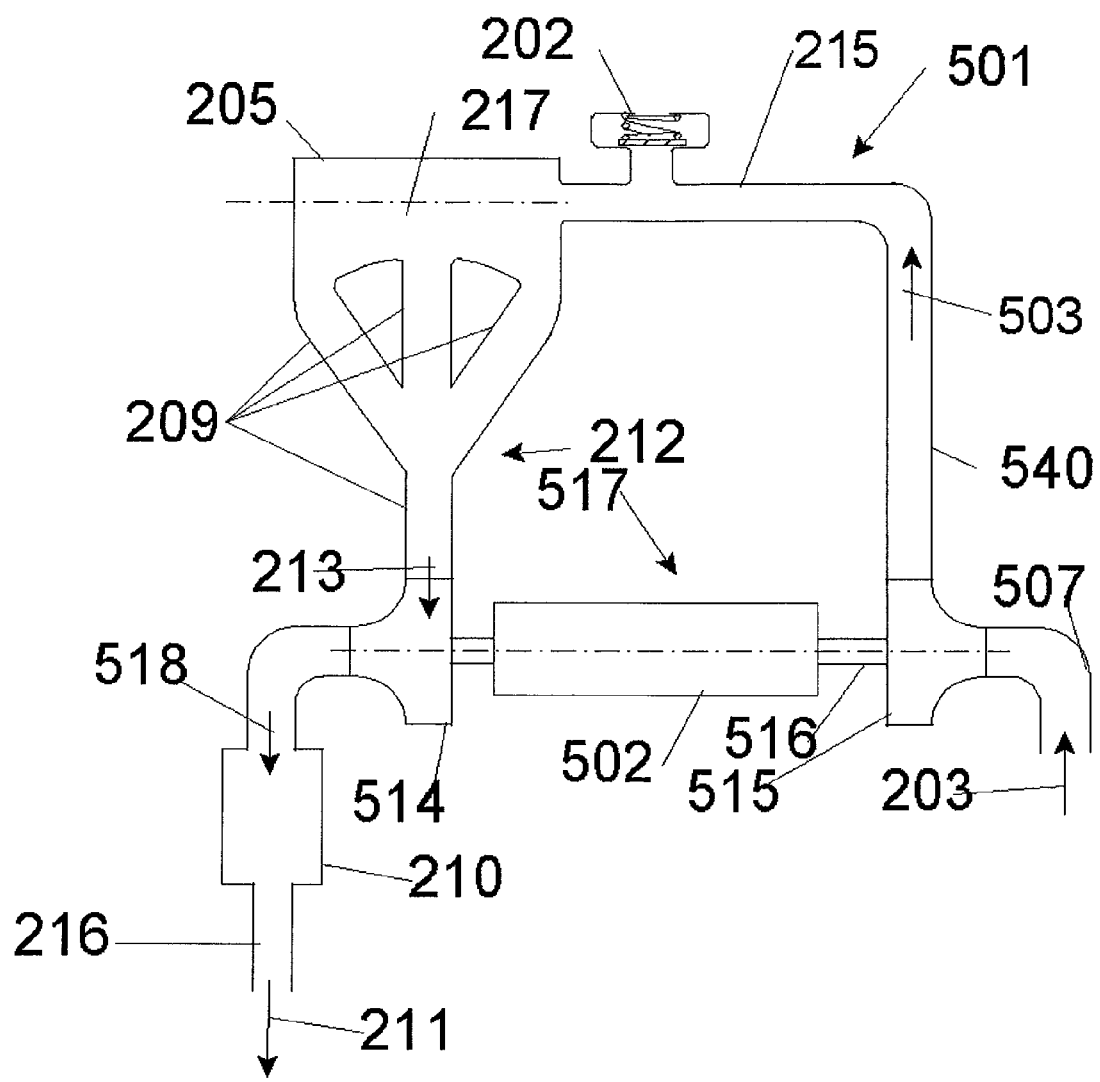

System 501, FIG. 5, shows a turbocharger 517 directly coupled to an electrical motor/generator 502.

DETAILED DESCRIPTION OF THE INVENTION

Figure 1:
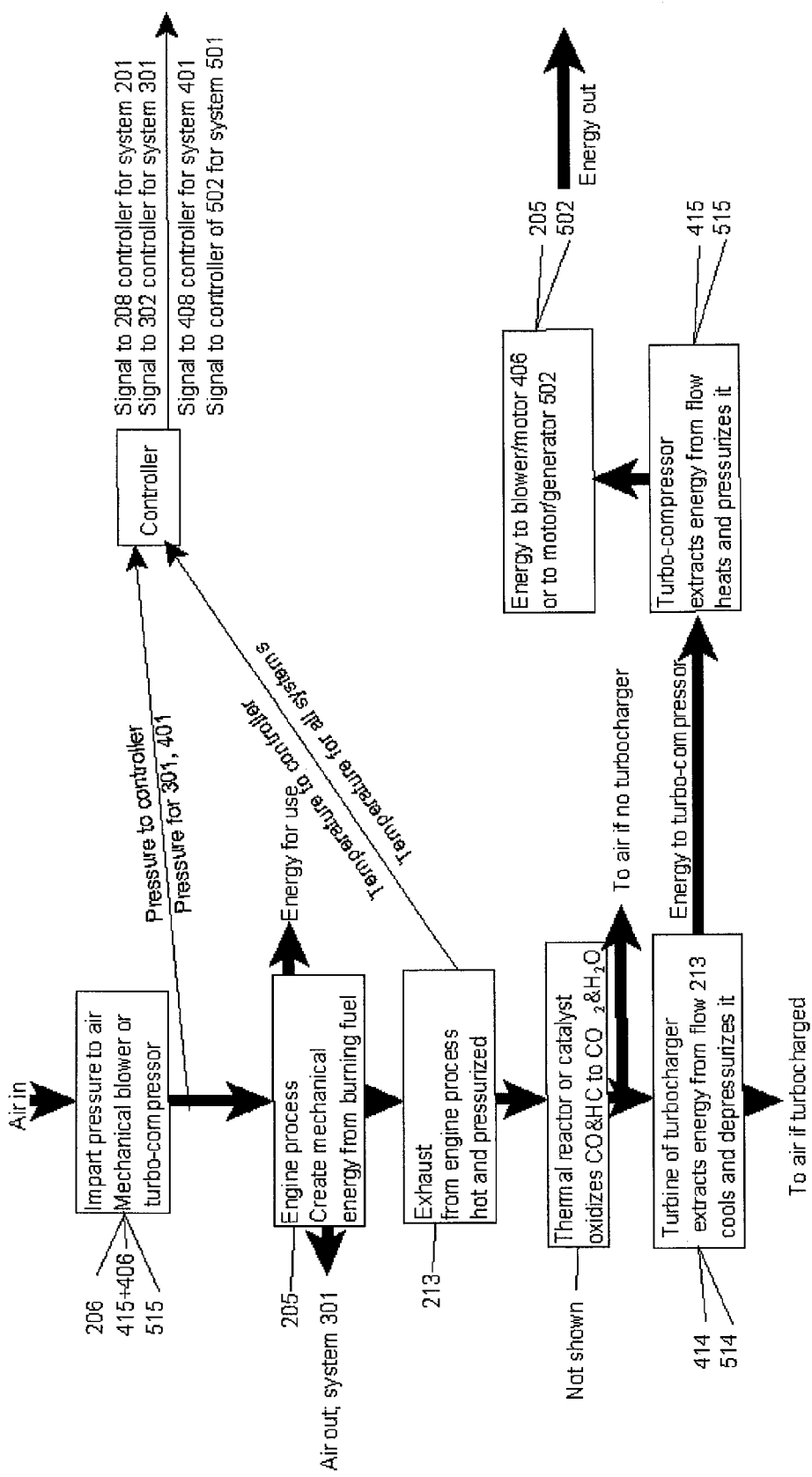
FIG. 1 is a block diagram that displays the intent of the invention. The invention is to gain efficiency and/or reduce pollution of the VCRC engine. This goal is best met with turbo charging.

Basic Intentions of the Invention:

FIG. 1 is a block diagram outlining the thrust of the invention's intentions. It outlines the fundamental processes of systems 201, 301, 401 and 501.

Flow through the power system can be described thusly. Air is supplied to engine 205 by blower 206, turbo-compressor 415 plus blower/motor 406 or by turbo-compressor 515. Engine 205 uses some of this air to generate mechanical power from burning fuel. Air supplied over that needed to burn aids efficiency. This is well known in the art. Excess air also cools processes inside engine 205.

Systems that Reduce Air Flow to Reduce Pollution:

Systems 201 and 301 are intended to control the pollution output of engine 205. Both do this by controlling the flow of air to engine 205. System 201 limits flow by using controllable coupling 208 to regulate speed of blower 206. Air supplied is in accordance with speed of blower 206. Coupling 308 in system 301 is fixed. Blower 306, therefore, runs at a fixed ratio of the speed of engine 205. Air is varied in system 301 by venting some of the air before the air is being injected to engine 205. System 301 varies vent or blow-off valve 302 in response to the temperature measured in exhaust gas flow 213.

System Regulating Exhaust Temperature by Blower Speed:

System 201 diminishes pollution by including a thermal reactor or catalytic oxidizer. Neither of these are shown in FIG. 2. Their use and placement in IC engines is well known in the art. Either of these devices requires gas above a certain temperature to deoxidize well. IC engines like VCRC and CI engines display exhaust temperature opposite to leanness. Thus reducing their air supply will increase exhaust temperature for both.

FIG. 2 shows a system 201 that can accomplish this. Air flow 203 entering through air intake 207 is pumped by blower 206 into engine 205. Blower 206 is driven by controllable coupling 208. Speed of blower 206 is regulated to maintain temperature of exhaust flow 213. This temperature is held high enough for proper oxidizing of pollutants. Reducing the speed of blower 206 by regulating coupling 208 accomplishes this temperature control. After blower 206, air flow 214 into engine 205 is at a higher pressure than is its input flow 203. Before engine 205, the air flows through throttle valve 204, then through manifold 215. Throttle valve 204 can be regulated by a servo mechanism, not shown. Valve 204 can provide auxiliary vehicle braking when such is desired. It does this by imposing a pressure drop on flow 214 driven by blower 206. FIG. 2 depicts a three cylinder engine 205. Exhaust flow 213 from engine 205 flows through exhaust pipes 209. From thence, exhaust flow 213 goes through muffler 210 to leave system 201 through system exhaust outlet 216. As noted, exhaust flow 213 is oxidized in thermal or catalytic reactors, not shown for clarity.

In all concepts, 201, 301, 401 and 501, a blow-off valve 202 protects engine 205. It is possible for pressure in flow 214 to be high enough to harm engine 205. Such can occur through controller malfunction or blockage in flow through engine 205. Blow-off valve 202 is possibly a simple spring loaded valve. As such it is almost completely reliable. Valves like this will almost always function as designed. The only valve more reliable is a frangible diaphragm. This could serve in place of the spring-loaded blow-off valve 202 shown. A frangible diaphragm could also be placed in parallel with a spring loaded valve. This would ensure almost perfect reliability. The frangible diaphragm in parallel should be set at higher pressure than blow-off valve 202.

Heating Exhaust by Venting Blower Output;

FIG. 3 shows system 301. This holds temperature of exhaust flow 213 high enough by venting excess flow from blower 206. Only the inlet air flow 214 not vented through a vent valve 302, which is controlled by a servo mechanism and which servo mechanism regulates the exhaust temperature above a defined minimum, flows through engine 205. In system 301 coupling 308 is a simple drive. Speed of blower 206 is a fixed ratio of engine 205 speed through coupling 308. Inlet air flow 214 goes though regulated vent valve 302 or to engine 205. Thus, flow to engine 205 is limited. It is easier to control a simple vent valve 302 than to adjust a transmission coupling 208 to different ratios. As a result, system 301 is less costly and probably more reliable than system 201. System 301 could, however, be less efficient.

Turbocharger Plus Blower System:

System 401, shown in FIG. 4, depicts turbocharged IC engine with the addition of blower/motor 406 used after the output of turbo-compressor 415 of turbocharger 417. Blower/motor 406 serves two functions. The most basic use is to start the VCRC engine in two-stroke mode. Since the most efficient form of the VCRC is two-stroke, this function is important. After starting, there is usually enough energy in turbocharging to continue engine running. Ricardo, Harry R., *The High Speed Internal Combustion Engine*, Fourth Edition, Blackie & Son, Ltd., 1967, referred to as Ricardo, states on p 200, " . . . for there is energy enough and to spare in the exhaust to provide the power needed [to drive the turbo-compressor] . . . ". Blower/motor 406 will maintain airflow if there is insufficient energy in the turbocharging for running.

The second function is to utilize some of the exhaust energy that the turbocharger 417 has in excess. Currently, this excess energy is dissipated across what is called a 'waste gate'. This mechanism is generally a simple pressure dropping valve. In any event, it wastes energy. System 401 delivers some of this energy to the load by the output of the turbo-compressor 415. The excess pressure drives the blower/motor 406 as a motor. Output of blower/motor 406 adds to output of engine 205 for the load.

FIG. 4 shows the mechanism for doing this. The output of turbo-compressor 415 is directed to the input of blower/motor 406. Speed of blower/motor 406, relative to engine 205 speed, is varied by regulation of coupling 408. Coupling 408 is regulated by a servo mechanism in response to a signal from a pressure sensor at air inlet flow 214. An override from the temperature at exhaust flow 213 also controls coupling 408. This maintains the temperature needed by the oxidizing system mentioned in discussion of FIG. 1. In this way, the thermal reactor or catalyst is effective in reducing pollution. The slower that blower/motor 406 does rotate, the less air is supplied to engine 205. There is a limit to this correlation. If almost no air is supplied, the exhaust will be almost zero. In this case, there will be low temperature measured at exhaust flow 213. Those skilled in the art of servo control design know how to compensate for this eventuality.

Need for the override is limited. The exhaust 213 flow in system 401 will normally be hot enough for proper deoxidizing operation. During an initial warm-up phase of engine 205, this may not be true. Coupling 408 may then slow blower/motor 406 to maintain flow 213 hot enough.

Turbocharger Driving Electrical Motor/Generator:

System 501, is shown in FIG. 5. This system absorbs any excess energy in driving motor/generator 502 as a generator. The power so generated could be used in a multiplicity of ways. Many methods are obvious to those skilled in the art. One is to send the power so generated to an electric system, if the vehicle using IC engine 205 is designed in a hybrid mode. A hybrid vehicle's motive power is shared between IC engine and electric motor. Another method is to use electrical output to support auxiliary subsystems in use. That power not so utilized could be dissipated across a power resistor. Alternately, the extra power could be stored in a battery for later use.

While preferred embodiments of air supply concepts to improve efficiency of VCRC engines in accordance with the present invention have been set forth fully and completely hereinabove, it will be apparent to one of skill in the art that various changes could be made without departing from the true spirit and scope of the subject invention which is accordingly to be limited only by the appended claims.

I claim:

1. A two-stroke internal combustion engine in which output torque is controlled by fuel delivery and in which pollutants are minimized, while efficiency is enhanced, by starting sequential combustion of fuel and air in a cyclically varying expansion volume, including a device to initiate ignition, for a first phase of combustion with a substantially uniform mixture of the fuel and air, enough richer than stoichiometric to suppress the formation of oxides of nitrogen, with said cyclically varying expansion volume containing substantially all the fuel to be burned in one cycle together with only some of the air required in one cycle, and with the subsequent combining of the combustion products of said first phase of combustion with all the remaining air required in said one cycle to substantially complete the combustion of all the fuel in a second phase of combustion, the two-stroke internal combustion engine including:

a blower providing air flow to said engine;

a controllable coupling driving said blower from said engine, said controllable coupling being usable to control a ratio of a rotational speed of said blower with respect to a rotational speed of said engine;

a controllable throttle valve in a manifold defining an air flow passage out of said blower to an air intake of said engine;

a vent passage beyond, in a direction of the air flow out of said controllable throttle valve, to the exterior air and after the air intake of the engine;

a controllable vent valve located at an end of said vent passage remote from said controllable throttle valve, said controllable vent valve normally being closed; and a servo control system for controlling said controllable coupling in response to a device sensing when engine braking is needed, said servo control system also controlling said controllable throttle valve and said controllable vent valve at said end of said vent passage, said servo control system controlling said controllable throttle valve and said controllable vent valve to provide said braking of said engine.

2. The engine as set forth in claim 1 further including a blow-off valve placed in said vent passage between the air flow at the air intake of said engine and the exterior air outside said engine, said blow-off valve being capable of exhausting air flow outside of said air intake of said engine if a pressure of said air at said air intake of said engine exceeds a level which is safe for continued operation of said engine.

3. A two-stroke internal combustion engine in which output torque is controlled by fuel delivery and in which pollutants are minimized, while efficiency is enhanced by starting sequential combustion of fuel and air in a cyclically varying expansion volume, including a device to initiate ignition, for a first phase of combustion with a substantially uniform mixture of the fuel and air, enough richer than stoichiometric to suppress the formation of oxides of nitrogen, with said cyclically varying expansion volume containing substantially all the fuel to be burned in one cycle together with only some of the air required in one cycle, and with the subsequent combining of the combustion products of said first phase of combustion with all the remaining air required in said one cycle to substantially complete the combustion of all the fuel in a second phase of combustion, the two-stroke internal combustion engine including:

a turbo-compressor drawing air from the surrounding environment, said turbo-compressor being driven by a turbine which is driven by an exhaust gas flow from said engine;

a blower receiving air from an output of said turbo-compressor, said blower being adapted to function as a motor if an input pressure of said air received by said blower from the output of said turbo-compressor to said blower is higher than an output pressure of air from said blower;

a controllable coupling driving said blower from said engine, said controllable coupling being usable to control a ratio of a rotational speed of said blower with respect to a rotational speed of said engine, and a servo control system for controlling said controllable coupling driving said blower in response to a device sensing the output pressure of air flow into said engine from said blower, said servo control system controlling said controllable coupling to maintain said output pressure of said air flow into said engine from said blower below a pressure that would be damaging to said engine.

4. The engine set forth in claim 3 further including a blow-off valve placed between an air intake of said engine and air outside said engine, said blow-off valve being capable of exhausting air flow outside said air intake of said engine if a pressure of said air at said air intake of said engine exceeds a level which is safe for continued operation of said engine.

5. The engine set forth in claim 3 further including wherein said cyclically varying expansion volume varies a compression ratio of said engine in reverse accordance with the first combustion volume.

6. A two-stroke internal combustion engine in which output torque is controlled by fuel delivery and pollutants are minimized, while efficiency is enhanced by starting sequential combustion of fuel and air in a cyclically varying expansion volume, including a device to initiate ignition, for a first phase of combustion with a substantially uniform mixture of the fuel and air, enough richer than stoichiometric to suppress the formation of oxides of nitrogen, with said cyclically varying expansion volume containing substantially all the fuel to be burned in one cycle together with only some of the air required in one cycle, and with the subsequent combining of the combustion products of said first phase of combustion with all the remaining air required in said one cycle to substantially complete the combustion of all the fuel in a second phase of combustion, the two-stroke internal combustion engine including:

a turbo-compressor drawing air from the surrounding environment, said turbo-compressor being driven by a turbine which is driven from an exhaust gas flow from said engine;

a first electric motor driven by said turbine, said first electric motor being capable of generating electrical power when driven faster than a no-load speed;

a second electric motor delivering mechanical power in parallel with said engine; and a servo control system for controlling said first and second electric motors in response to a device sensing input air pressure to said engine, said device sensing said input air pressure to said engine having a signal which said servo control system can interpret.

7. The engine set forth in claim 6 further including a blow-off valve placed between an air intake of said engine and air outside said engine, said blow-off valve being capable of exhausting air flow outside said air intake of said engine if a pressure of said air at said air intake of said engine exceeds a level which is safe for continued operation of said engine.

8. The engine set forth in claim 6 further including wherein said cyclically varying expansion volume varies a compression ratio of said engine in reverse accordance with the first combustion volume.

* * * * *